ELECTROMECHANICAL ACCUMULATOR

Filed Nov. 23, 1964 5 Sheets-Sheet 1

INVENTORS
ROBERT T. BRUMBAUGH,
EARL G. CROMER Jr & CHESTER S. CZYRYK
BY Bair, Freeman & Molinare Attys.

Oct. 1, 1968 R. T. BRUMBAUGH ET AL 3,404,395

ELECTROMECHANICAL ACCUMULATOR

Filed Nov. 23, 1964 5 Sheets-Sheet 2

INVENTORS
ROBERT T. BRUMBAUGH,
EARL G. CROMER Jr & CHESTER S. CZYRYK
BY Bair, Freeman & Molinare Attys.

ELECTROMECHANICAL ACCUMULATOR

INVENTORS
ROBERT T. BRUMBAUGH,
EARL G. CROMER Jr & CHESTER S. CZYRYK
BY Bair, Freeman & Molinare Attys.

Oct. 1, 1968 R. T. BRUMBAUGH ET AL 3,404,395

ELECTROMECHANICAL ACCUMULATOR

Filed Nov. 23, 1964 5 Sheets-Sheet 4

INVENTORS
ROBERT T. BRUMBAUGH,
EARL G. CROMER Jr & CHESTER S. CZYRYK
BY Bair, Freeman & Molinare Attys.

INVENTORS
ROBERT T. BRUMBAUGH,
EARL G. CROMER Jr & CHESTER S. CZYRYK
BY Bair, Freeman & Molinare Attys.

3,404,395

ELECTROMECHANICAL ACCUMULATOR

Robert T. Brumbaugh, Wilmette, and Earle G. Cromer, Jr., Mount Prospect, Ill., and Chester S. Czyryk, Silver Lake, Wis., assignors to Mangood Corporation, a corporation of Illinois Filed Nov. 23, 1964, Ser. No. 413,032
7 Claims. (Cl. 340—347)

ABSTRACT OF THE DISCLOSURE

A electromechanical data accumulator having a plurality of rotatable disks, each with coded conductive tracks thereon. The disks are moved to different positions in response to the digital value of the measured condition, and the coded conductive tracks correspond thereto. On command, the tracks are succesively scanned and voltage pulses therefrom feed into a translator device which converts the pulses into electrical code pulses compatible to a computer.

This invention relates to electromechanical accumulators and more particularly to apparatus for receiving, storing and transmitting on command data in the form of digital information.

In any large scale data collection program, such for example as a traffic counting program, the collection, reduction and retrieval of data becomes a problem of major proportion. Often the degree to which this problem is solved is directly related to the success and efficiency of the overall program. An optimum solution is one wherein the data is collected in real time and is automatically introduced into some form of storage media with a high degree of accessibility.

To date a great deal of work has been done in the field of computers for storing and data retrieval and these are readily available. There has been, however, to date no satisfactory means of gathering data and introducing it into the computer. The standard technique currently employed requires the physical collection of data from various collection stations, bringing the data to a collection center and then manually introducing it into a computer compatible format or in some cases semi-automatically translating it into a form acceptable to the computer. In either case the task is time consuming and since the data reduction is after the fact, or not in real time, it is very susceptible to errors in time which can destroy the integrity of the recorded data.

It is accordingly one of the objects of the present invention to provide an electromechanical accumulator which automatically receives and stores data and which translates the data into the form of coded electrical pulses acceptable to a computer and corresponding to the digits in a number representative of the stored data.

Another object is to provide an electromechanical computer which is extremely compact and which may be battery operated so that it can be completely self-contained for use in any desired location.

According to a feature of the invention the accumulator includes a plurality of rotatable discs each having coded conductive tracks thereon and which are moved to different positions corresponding to the digital value of the condition to be measured. On command the tracks on the discs are successively scanned and voltage pulses therefrom are fed into a translator device which converts the pulses into electrical code pulses compatible with the computer with which the accumulator is used. In most cases the computer code requires a greater number of separate pulses than can properly be placed on the discs and the translator device functions to translate a small number of pulses received from the discs into a larger number of pulses required by the computer.

The above and other objects and features of the invention will be more readily apparent from the following description when read in connection with the accompanying drawings, in which.

Figure 1:
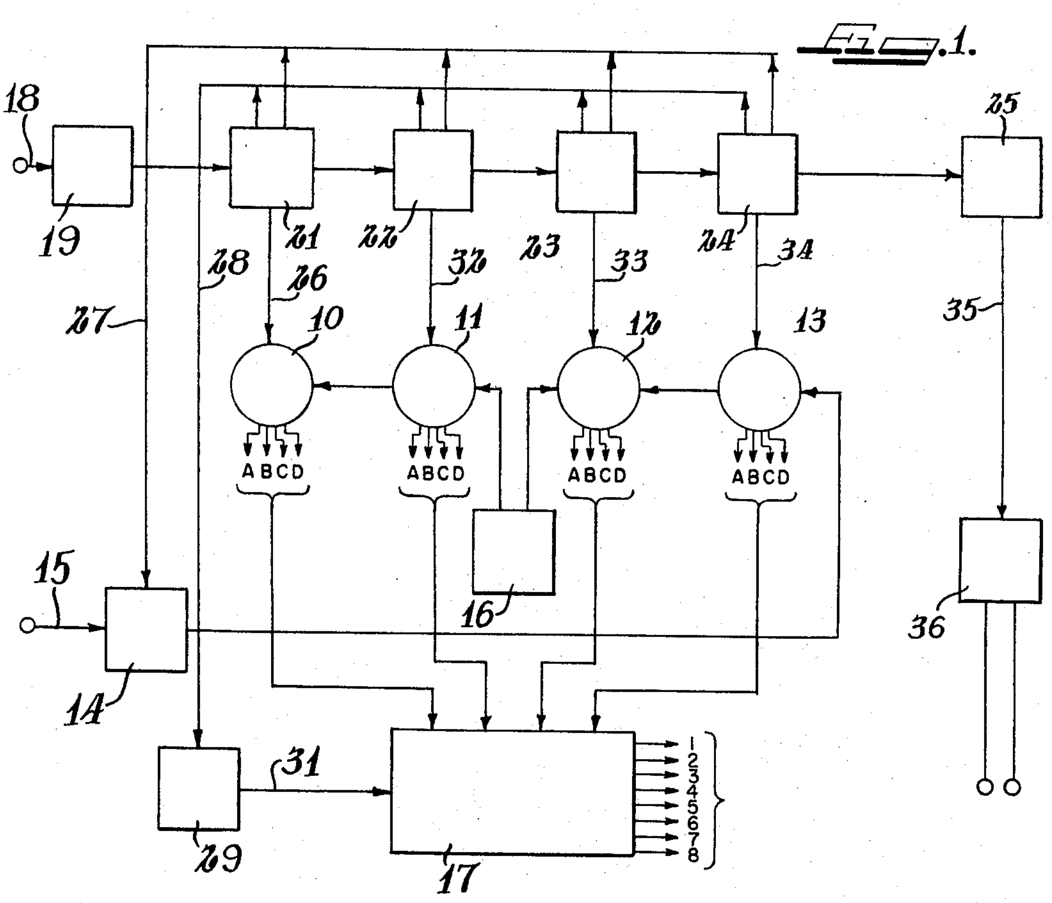
FIG. 1 is a block diagram of a complete electromechanical accumulator embodying the invention.

Referring first to the block diagram, FIG. 1, the complete accumulator mechanism comprises a series of discs 10, 11, 12 and 13 corresponding respectively to thousands, hundreds, tens and units in a digital value to be accumulated and transmitted. It will be understood, of course, that a greater or smaller number of discs could be employed depending upon the maximum value to be stored and transmitted and the four discs illustrated are merely typical. The discs are moved by an input or driving mechanism indicated by a driver 14 to which the values to be recorded are received from any suitable source as illustrated by the arrow 15. The driver 14 drives the unit disc 13 which in turn drives the tens disc 12 in a manner to be described more fully hereinafter. The tens disc 12 through a driver 16 drives the hundreds disc 11 and in turn the thousands disc 10 as illustrated. Each of the discs is provided on its face with a coded conductive track which will be described more fully hereinafter and which provides for output channels of information as indicated by the four arrows extending from the lower portion of each disc and which are marked respectively A, B, C and D. Each of the lines A, B, C and D on each disc feeds successively into a translator device 17 which will be described in greater detail hereinafter. The translator as illustrated has seven output channels plus a common lead marked 1 through 8 respectively which feed into a data transmission system to the computer and which supply the computer with information in compatible form. It will be understood that for various different types of computers the number of input channels supplied by the translating device could be either greater or less than the seven illustrated, these being selected as being consistent with the computer operation of a 401–H computer manufactured and utilized by Bell Laboratories in a data collection system.

Read out of the information stored on the discs is controlled on receiving a command signal which may be supplied by the computer at predetermined time intervals as indicated by the arrow 18. This signal is fed through a delay device 19 which delays the transmission of the signal for a predetermined interval for example approximately three seconds to provide time for transients in the transmission line to be dissipated. The command signal is then supplied to a scanning circuit which as shown comprises a plurality of oneshot multivibrators 21, 22, 23, 24 and 25 in sequence. Since these multivibrators are conventional structures functioning in a well understood manner they will not be further described herein. When the multivibrator 21 is triggered its transmits a pulse through a line indicated at 26 to the thousands disc 10 to make the thousands disc effective to transmit information stored thereon to the translator device 17. At the same time it transmits a pulse to a line 27 leading to the driver 14 to disable the driver so that the discs will not be driven during a read out operation which might create a false reading. However, since the read out operation takes only a fraction of a second no appreciable inaccuracies will be introduced into the data collection count. The multivibrator 21 also introduces a pulse through a line 28 to a oneshot multivibrator 29 which supplies a gating voltage through a line 31 to the translator device. In a typical installation the pulse produced by the multivibrator 21 has a duration of 80 milliseconds and the pulse produced by the multivibrator 29 has a duration of 40 milliseconds which provides ample time for the translator device to transmit a coded signal indicative of the digital position of the disc 10. By making the time intervals of the multivibrator 29 shorter than that of the multivibrator 21 no possibility of confusion of signals exists and the readings indicative of the positions of the various discs are cleanly separated.

Upon termination of the pulse of the multivibrator 21 it will trigger the multivibrator 22 which transmits a signal through a line 32 to the hundreds disc 11 to make it effective to transmit information representative of its position to the translator device. It will be noted that this multivibrator also supplies pulses to the lines 27 and 28 to disable the driver and to trigger the multivibrator 29 to supply a gating pulse to the translator device. In a similar manner the multivibrator 23 is triggered to transmit a pulse through a line 33 to the tens disc 12 so that it will transmit information to the translating device and subsequently to the multivibrator 24 so that it will transmit a pulse through a line 34 to the units disc 13 to make it effective to transmit information to the translator device. When the multivibrator 24 shuts off it will trigger the multivibrator 25 which may produce a pulse having a duration on the order of 120 milliseconds. This multivibrator will transmit a pulse through a line 35 to a relay 36 which may transmit information back to the computer that the reading is completed.

Figure 6:
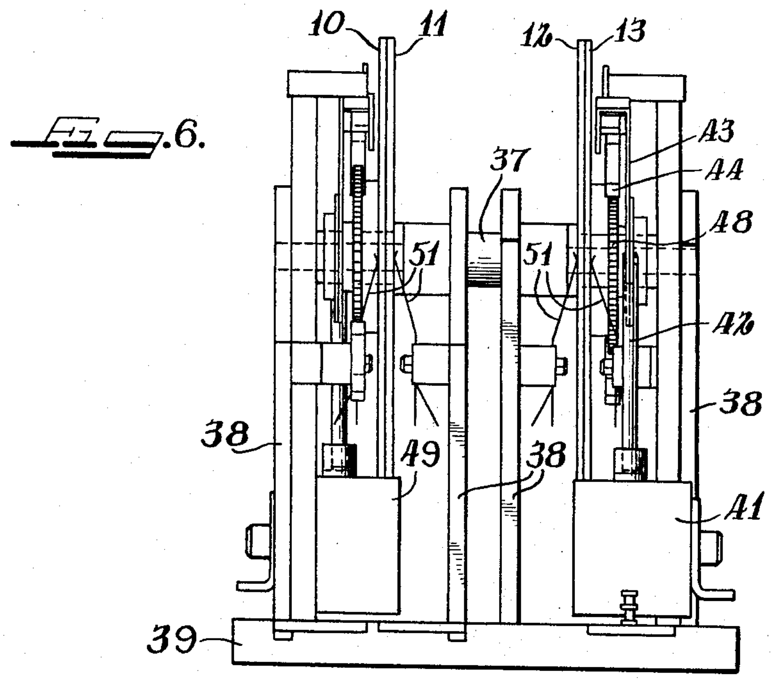
FIG. 6 is an end elevation of a mechanical accumulator mechanism embodying the invention.
Figure 7:
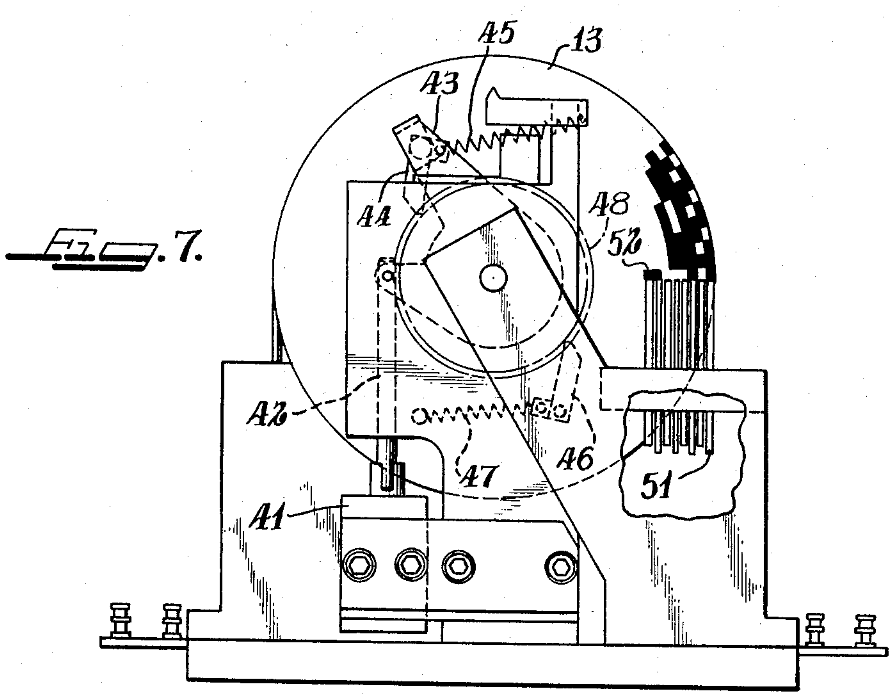
FIG. 7 is a side elevation of the mechanism of FIG. 6.

One mechanical structure of the disc mechanism is illustrated in FIGS. 6 and 7 which is particularly useful for counting operations such as traffic counting. In this construction the units and tens discs 13 and 12 are either separate discs connected back to back or are formed by opposite sides of a single disc. Similarly the hundreds and thousands disc 11 and 10 are either separate interconnected discs or are formed by the opposite faces of a single disc. The two discs comprising the units and tens disc and the hundreds and thousands discs are separately rotatably mounted on a shaft 37 supported on uprights 38 on a base 39. The units and tens disc is adapted to be driven step-by-step by a solenoid 41 mounted on the base and whose core is connected by a link 42 to a rotatable disc 43 which carries a pawl 44. A spring 45 urges the disc 43 in a clockwise direction as seen in FIG. 7 and when the solenoid 41 is energized it will rock the disc through a predetermined angle counterclockwise to advance the units and tens disc through a single step corresponding to one digit. Preferably a second pawl 46 urged by a spring 47 is provided carried by the frame to prevent accidental reverse rotation of the units and tens disc. The two pawls 44 and 46 mesh with a ratchet 48 which is secured to the units and tens disc as shown. Thus each time the solenoid 41 is energized by a pulse supplied by the driver unit 14 which may be a oneshot multivibrator the units and tens disc will be advanced to a single step corresponding to one unit. Upon each revolution of the units and tens disc a pulse will be transmitted to a solenoid 49 which functions to advance the hundreds and thousands disc. The solenoid 49 may actuate a rotatable plate and pawl mechanism similar to that described above in connection with the units and tens disc so that the hundreds and thousands disc will be advanced one step corresponding to $\frac{1}{100}$ unit each time the units and tens disc makes a complete revolution.

Figure 4:
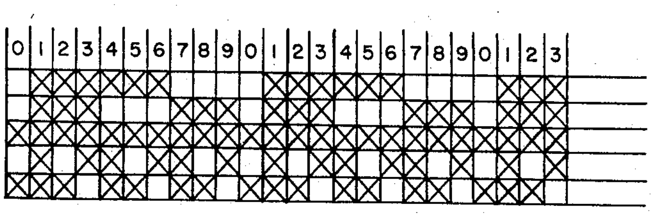
FIG. 4 is a diagrammatic view indicating one convenient code as employed in the conductive tracks on the discs.

Each of the discs or the face disc corresponding to units, tens, hundreds and thousands is provided with a coded pattern as partially illustrated in FIG. 7 in connection with the units disc. This pattern is best seen in FIG. 4 which diagrammatically illustrates a typical configuration providing a common channel and four output channels various combinations of which are representative of the digits 0 through 9 inclusive. As shown in FIG. 4 the common channel is the third or center channel and extends continuously in an annular ring completely around the face of the disc. The other channels are in the form of broken segments which are so placed that different combinations of circuits between the segments and common channels will be completed upon each movement of the discs through a single step.

The several channels of the coded conductive layer on the discs are adapated to be engaged by brushes as indicated at 51. As shown there are eight separate brushes in each set, five of which contact the coded channels and the common channel as described above. The end two brushes on the units disc are adapted to engage a short segment 52 which is spaced from the coded conductive area as shown in FIG. 7 each time the units and tens disc makes one complete revolution. Contact of the short segment with the two end brushes will produce an operative pulse for momentarily energizing the solenoid 49 to advance the hundreds and thousands disc. The one additional brush of the set of eight of the units disc is left blank to provide a space between the segment 52 and the coded conductive area to avoid any possibility of short circuiting and false readings.

The tens disc is similarly coded except that in this case a complete set of digits from 0 through 9 extends around the complete circumference of the disc in an annular pattern. The units disc as will be seen from FIG. 7 will contain ten complete patterns so that each revolution of the combined units and tens disc represents 100. The pattern on the tens disc will indicate the decades within 100 with the different patterns on the units disc indicating simultaneously the units within the decades. It will be understood in this connection that while the pattern has been shown as broken down into segments of ten units each, a different base could be employed for different types of measurements. For example, in obtaining remote readings of water levels in feet and inches the units could be divided into sections of 12 and the tens disc could show feet with the hundreds and thousands discs if employed showing multiples of 12 feet. Similarly for different types of readings each segment on the units disc could be broken up into a number of units less than ten depending upon the character of the data to be stored and transmitted.

Figure 8:
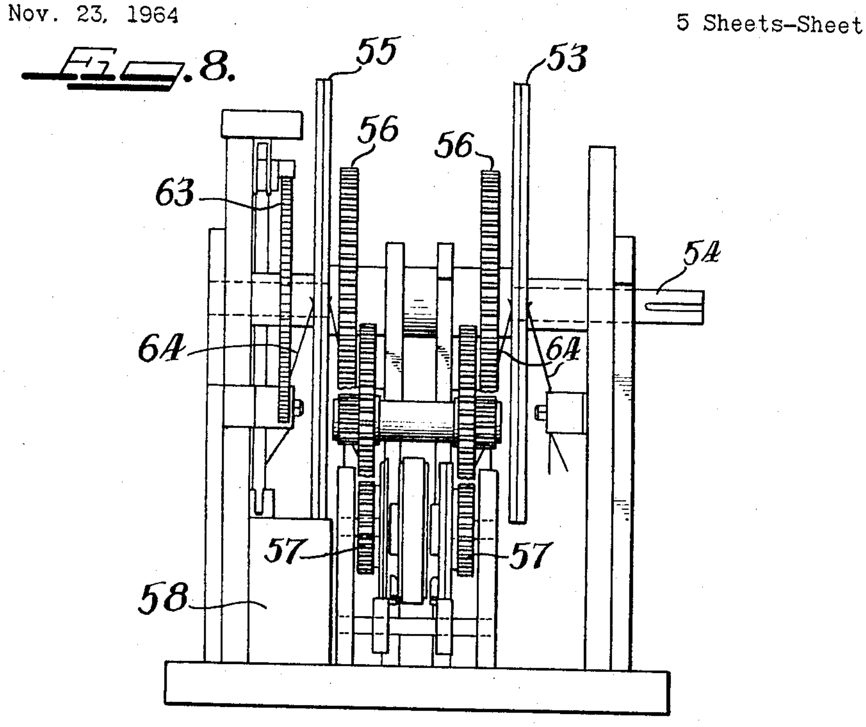
FIG. 8 is a view similar to FIG. 6 of an alternative type of mechanism according to the invention.
Figure 9:
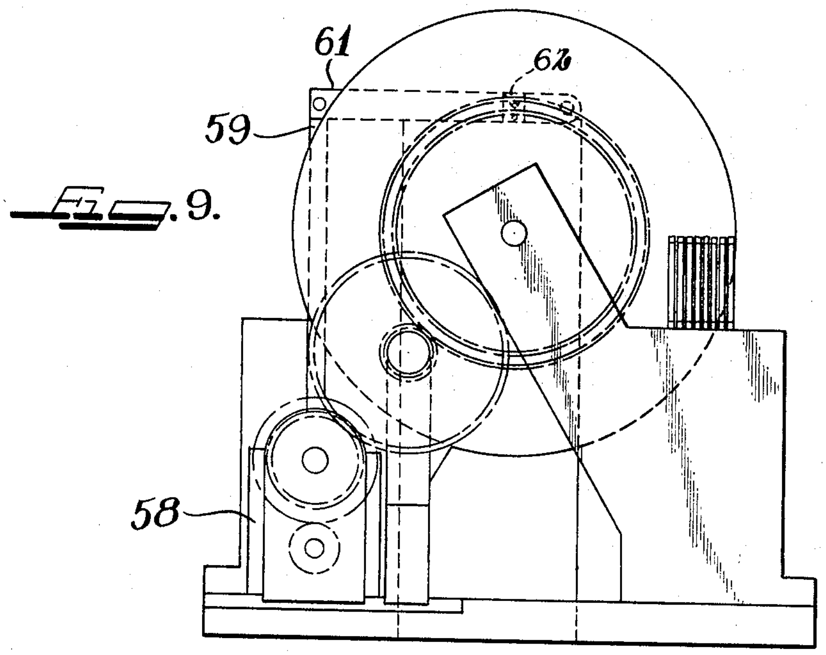
FIG. 9 is a side elevation of the mechanism of FIG. 8.

An alternative disc structure is illustrated in FIGS. 8 and 9 wherein the input is in analogue rather than digital form and the analogue values are converted to digits in the unit and transmitted thereby to the translator mechanism. As shown in these figures the units and tens disc 53 is mounted on a shaft 54 which extends beyond the frame of the device and which may be driven in any desired manner to a position corresponding to an analogue value. For example, in the measurement of water levels the shaft 54 could be driven by a float or the like to be positioned in accordance with variations in water level. The hundreds and thousands disc 55 is mounted for free rotation relative to the units and tens disc 53 and the two discs are connected through a transfer mechanism which will advance the hundreds and thousands disc one unit step for each complete revolution of the units and tens disc. As shown each disc has a gear 56 connected thereto and the gears are connected through pinions 57 which are in turn connected by a transfer mechanism similar to that employed in the usual digital counter and which will advance the hundreds and thousands disc one step for each complete revolution of the units and tens disc. To prevent movement of the discs during a read out operation a solenoid 58 is provided which is connected through a link 59 to a lever 61 pivoted on the frame of the device and carrying a pawl 62 which will engage with a gear or ratchet member 63 when the solenoid is energized to lock the shaft 54 in position. The discs in this construction will carry conductive coded patterns similar to those illustrated in FIGS. 7 and 4 and which are engaged by brushes similar to the brushes 51 of FIGS. 6 and 7 as shown at 64. Other than the manner of driving the discs and transferring motion from the units and tens disc to the hundreds and thousands disc the construction of FIGS. 8 and 9 is substantially identical to that of FIGS. 6 and 7.

Figure 2:
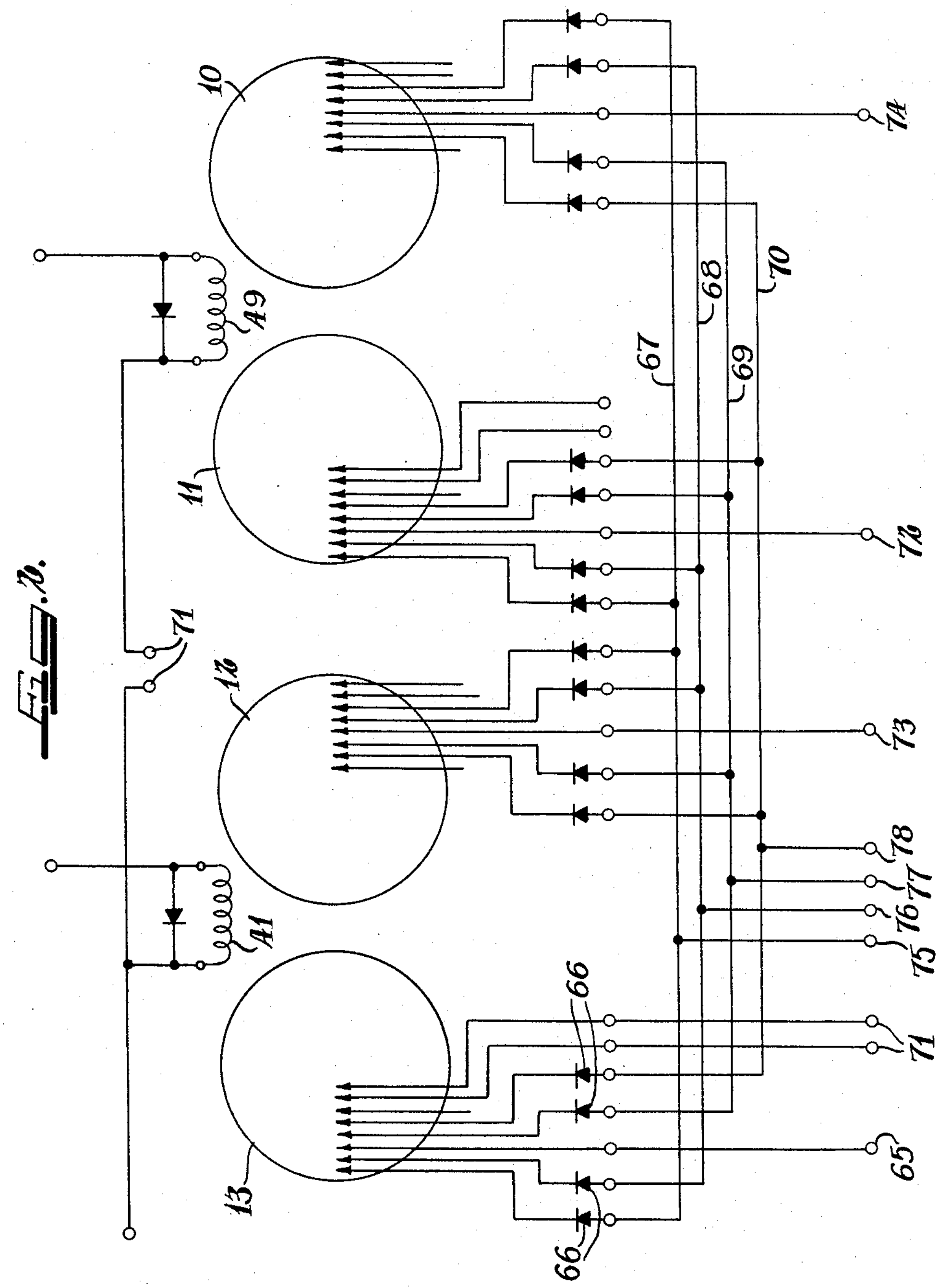
FIG. 2 is a circuit diagram illustrative of the discs and the pickup circuits therefrom.

The electrical connections to the several discs are more particularly illustrated in FIG. 2. As shown in this figure the brush which engages the common track on the units disc 13 is connected to a terminal 65 which is in turn connected to the line 26 as shown in FIG. 1 to be energized when the multivibrator 21 is triggered. The brushes contacting the four coded tracks are connected through rectifiers 66 to four lines 67, 68, 69 and 70 which are common to the four brushes contacting the coded tracks of all of the discs. The two inner brushes on the units disc are connected to terminals 71 which are in turn connected to correspondingly numbered terminals in the line supplying input pulses to the solenoids 41 and 49. With this circuitry each time an input pulse is received from the driver 14 the solenoid 41 will be energized but the solenoid 49 will only be energized when the two contacts at the right hand of the units disc as seen in FIG. 2 are bridged by the conductive segment 52. The connections of the brushes and the conductive pattern on the hundreds disc 11 are identical to those on the units disc as shown in FIG. 13 and the brushes corresponding to the coded patterns on this disc are similarly connected through rectifiers to the lines 67 to 70 respectively. The brush engaging the common track is connected to a terminal 72.

The arrangement of the conductive track and of the brushes on the tens disc 12 and the thousands disc 10 is somewhat different than that on the units and hundreds disc as illustrated in FIG. 2. In these discs the two brushes at the outer periphery of the discs are left blank and the one brush at the inner periphery is also left blank with the common channel and the four coded channels being connected to the five central brushes. The coded channels are connected respectively to the lines 68 to 70 through rectifiers as in the case of the units and hundreds discs and the common channel on the tens disc 12 is connected to a terminal 73. The common channel on the thousands disc 10 is similarly connected to a terminal 74 with the brushes contacting the coded channels being connected to the lines 68 to 70 respectively through rectifiers as shown.

The terminals 73, 72 and 74 are connected to the lines 32, 33 and 34 from the oneshot multivibrators 22, 23 and 24 so that the common channels of the several discs will be successively energized as the multivibrators are successively tripped to scan the discs in succession. In this way each disc will successively produce a voltage in one or more of the lines 67 to 70 inclusive which is indicative of the existing position of the discs. The lines 67 to 70 respectively are connected to terminals 75, 76, 77 and 78 through which the voltages on these lines are transmitted to the translator unit as shown in detail in FIG. 3. The terminals 75, 76, 77 and 78 are connected respectively to lines 79, 80, 81 and 82 which correspond to the four lines 67 to 70 respectively of FIG. 2. The translator unit comprises four transistors 83, 84, 85 and 86 which are respectively controlled in response to voltage in the lines 79, 80, 81 and 82. Each transistor is connected from a source of negative DC voltage shown as a terminal 87 through a resistor 88 to a ground terminal 89. A positive DC bias voltage on the order of 2.4 volts is supplied to a terminal 91. The terminal 91 is connected through a common line 92 and through a resistor 93 to the control electrode or base of each of the transistors 83, 84, 85 and 86. Solely the base of each transistor is connected through a resistor 94 to one of the lines 79, 80, 81 or 82. When no voltage is present on any of the lines 79, 80, 81 or 82 the transistors 83, 84, 85 and 86 will be biased into a nonconductive state. However, when a voltage is present on any of the lines 79 to 82 this voltage will be impressed on the base of the corresponding transistor to make it conductive. Gating of the translator device is controlled by a transistor 95 which is similar to the transistors 83 to 86 inclusive and which is connected in a similar manner. Thus the transistor 95 is connected through a resistor 96 to the negative terminal 87 and its base is connected through a resistor 97 to the bias voltage line 92. Its base is also connected through a resistor 98 to a terminal 99 to which the gating line 28 of FIG. 1 is connected. Thus whenever a negative gating voltage is present on the line 28 due to the fact that any one of the one-shot multivibrators 21 through 24 is operating the transistor 95 will be conducting.

The points between the respective transistors 83, 84, 85 and 86 and their corresponding resistors 88 are connected respectively to control lines 101, 102, 103 and 104 respectively. When the transistors are not conducting the negative bias voltage from the terminal 87 will flow through the resistors 88 and through the connections to the lines 101 to 104 respectively to impress a negative voltage on these lines. However, when any one of the transistors is made conductive by the presence of a voltage on the line 79, 80, 81 or 82 to which it is connected the negative bias voltage on the corresponding line 101, 102, 103 or 104 will be short circuited and removed so that line will then be at ground potential The point between the gating transistor 95 and its resistor 96 is connected to a gating line 105. When the transistor 95 is not conducting the negative voltage at the terminal 87 will be impressed on the gating line 105 but when the transistor 95 is conducting this voltage will be short circuited and the gating line 105 will be at ground potential. The translator unit further comprises a series of relay switches 106, 107, 108, 109, 110, 111 and 112 each of which is normally open and which is closed by a relay coil. One terminal of each of the switches is connected through a common line 113 to the terminal numbered 8 of the translator unit as shown in FIG. 1 and also in FIG. 3 which comprises a common line. The other contacts of the switches are connected respectively to the terminals 1 through 7 which constitute the output channel terminals of the translator unit as shown in each of FIGS. 1 and 3.

The switches are operated respectively by relay coils 114, 115, 116, 117, 118, 119 and 120. Each of the relay coils is connected at one side of the terminal 87 and at its other side through a rectifier 121 back to the terminal 87. The rectifiers 121 will absorb inductive kick from the coils when the coils are deenergized and will tend to prevent damage to the control circuits therefor. The coils are respectively controlled by transistors 122 through 128 respectively which are connected between the coils and the ground terminal 89 as shown. When the transistors are nonconducting the respective coils will be deenergized and the switches will be in their normally open position as shown. When a negative voltage is present on any one of the lines 79 to 82 it will be transmitted through the resistors 94 to the control electrode or base of the corresponding transistor 83 to 86 respectively to trigger it into conduction. When any one of the transistors becomes conductive it will shunt through the resistor 88 the voltage supplied from the terminal 87 and will remove the bias from the line 101, 102, 103 or 104 to which that particular transistor is connected. That line will therefore be at ground potential under these conditions and it will be seen that the various lines 101 to 104 are brought to ground potential in different combinations according to the conductive patterns on the discs as the discs are successively scanned by triggering of the multivibrator circuits.

The transistors 122 through 128 are controlled in response to voltage on the lines 79 to 82 and the control lines 101 to 104 as well as the voltage on the gating line 105. The control electrode or base of each of these transistors is connected to the gating line 105 through a rectifier 129 so that as long as there is a negative voltage on the gating line 105 none of the transistors can conduct. Additionally the control electrode of each transistor 122 through 128 is connected through rectifiers 131 to two or more of the lines 79 to 82 and 101 to 104 in different combinations. The rectifiers 129 and 131 will prevent cross feeding between the different lines so that the transistors 122 to 128 will be controlled solely in response to the voltage present on one or more of the lines in which they are respectively connected.

Figure 5:
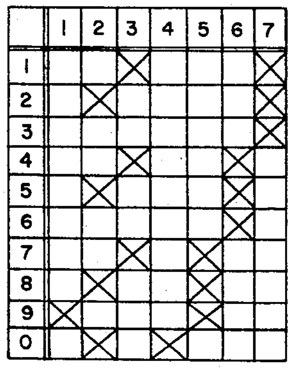
FIG. 5 is a diagrammatic view illustrating the voltage combinations on the disc coded tracks indicative of the various numerals.
Figure 3:
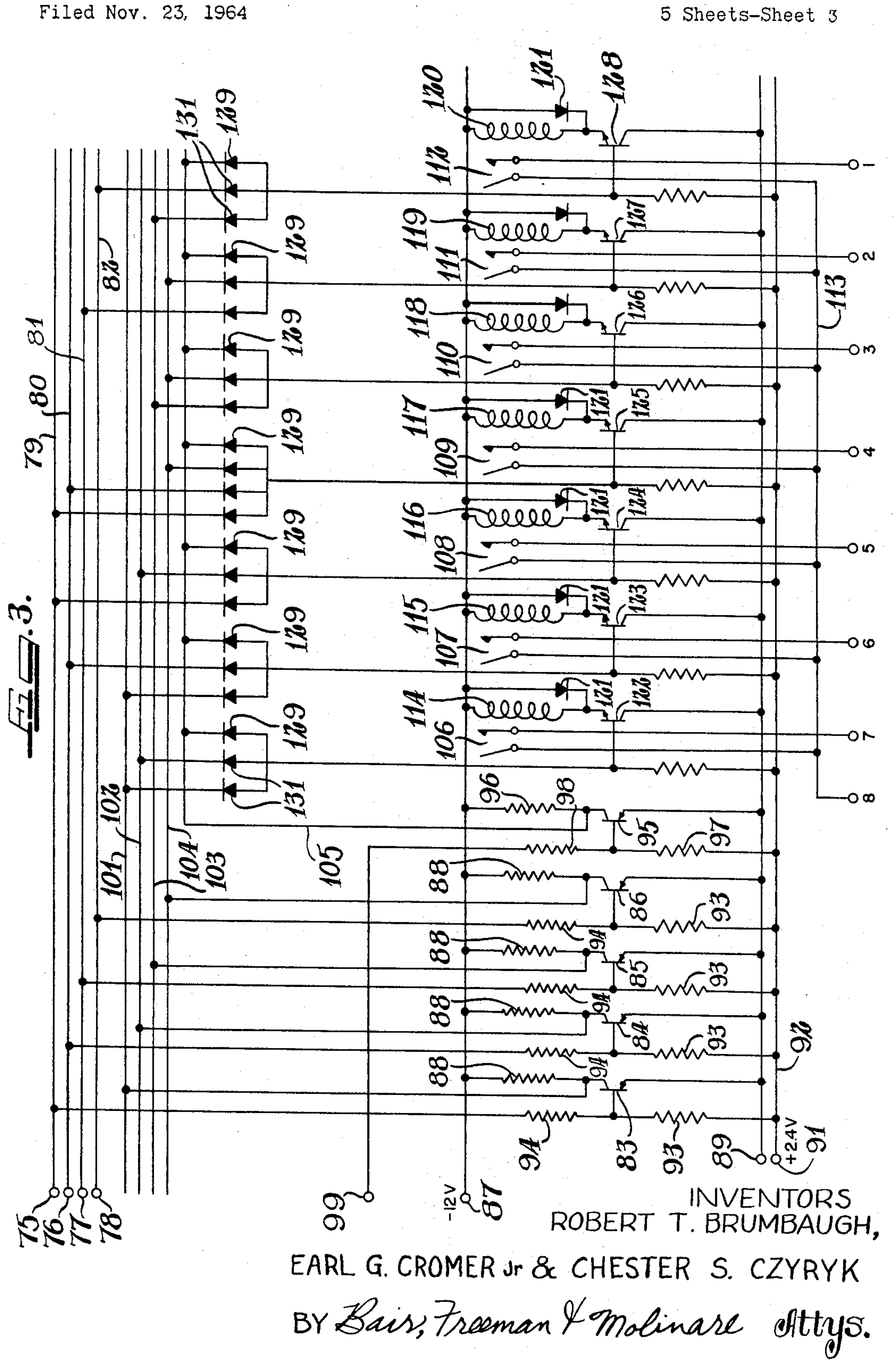
FIG. 3 is a circuit diagram of a translator device.

For example, the control electrode of the transistor 122 is connected to each of the lines 101 and 102 as well as to the gating line 105. Therefore as long as a negative voltage is present on any one of the lines 101, 102 or 105 the transistor 122 will be nonconductive. This transistor will be triggered into conduction only when a voltage signal is present on each of the lines 79 and 80 to trigger the transistors 83 and 84 thereby to remove the bias from the lines 101 and 102 and also when the gating transistor 95 is triggered by the presence of a gating voltage to remove the bias from the gating line 105. In a similar manner for example the transistor 125 is connected to each of the lines 79, 80 and 103 so that this transistor can be conductive only when the voltage on each of these three lines in addition to the gating line is removed. The remaining transistors as shown in FIG. 3 are connected to the different combinations so that the respective switches 106 to 112 will be closed only when the bias voltage is removed from the lines to which they are connected thereby to produce output signal voltages at the terminals 1 through 8 in different combinations depending upon which of the lines 79 to 82 is receiving a voltage signal from the discs. FIG. 5 illustrates a typical code which is compatible with existing computer mechanisms, the vertical spaces indicating the various digits from 1 through 0 and the horizontal numerals 1 through 7 corresponding to the terminals 1 through 7 of FIG. 3. The common terminal 8 is not illustrated since the circuit in each case is completed from one of the terminals 1 through 7 to the common terminal by closure of one of the switches 106 to 112 inclusive.

As seen in FIG. 5 two of the terminals 1 through 7 are simultaneously energized to indicate each of the digits from 1 to 0 respectively. It is to be understood, however, that the coding indicated by FIG. 5 is a typical code compatible with existing mechanisms and that other codes be devised according to the invention.

While one embodiment of the invention has been shown and described in detail, it will be understood that this is for the purpose of illustration only and is not to be taken as a definition of the scope of the invention, reference being had for this purpose to the appended claims.

What is claimed is:

1. An electromechanical accumulator comprising a plurality of rotatably mounted discs, means to turn the discs to a position corresponding to a value to be indicated, each of the discs having thereon a conductive coded pattern defining four coded tracks and a continuous common track, a set of five contacts for each disc engaging the coded tracks and common track respectively, a translator unit having four input lines and more than four output lines, means in the translator unit to generate voltages in the different output lines in response to different combinations of voltages in the input lines, and gating means selectively to supply voltage to the contacts for the common tracks of the discs whereby voltage combinations corresponding to the positions of the discs are selectively supplied to the input lines.

2. An electromechanical accumulator comprising a plurality of rotatably mounted discs, means to turn the discs to a position corresponding to a value to be indicated, each of the discs having thereon a conductive coded pattern defining a plurality of coded tracks and a common track, a set of contacts for each disc engageable with the coded tracks and common track respectively, a translator unit having a number of input lines equal to and connected respectively to the contacts for the coded tracks and a plurality of output lines, switch means in the translator unit connected to the output lines respectively and operable selectively to supply voltages to the output lines, means responsive to contact of the sets of contacts with the coded tracks on the discs to produce voltages in the input lines in response to the positions of the discs, and means in the translator unit, responsive to voltages in the input lines selectively to operate the switch means.

3. The electromechanical accumulator of claim 2 including means operable after the voltage applying means has applied voltage to each of the discs in succession to produce a signal indicative of completion of a complete read out operation.

4. An electromechanical accumulator comprising a plurality of rotatably mounted discs, means to turn the discs to a position corresponding to a value to be indicated, each of the discs having thereon a conductive coded pattern defining a plurality of coded tracks and a common track, a set of contacts for each disc engageable with the coded tracks and common track respectively, a translator unit having a number of input lines equal to and connected respectively to the contacts for the coded tracks and a plurality of output lines, switch means in the translator unit connected to the output lines respectively and operable selectively to supply voltages to the output lines, means operable to apply voltage to the common tracks of the discs successively and through the coded tracks on the discs to the input lines, means normally to maintain the translator unit in inoperative condition, gating means operable simultaneously with the voltage applying means to make the translator unit operative, and means in the translator unit responsive to voltage on the input lines selectively to operate the switch means.

5. An electromechanical accumulator comprising a plurality of rotatably mounted discs, means to turn the discs to a position corresponding to a value to be indicated, each of the discs having thereon a conductive coded pattern defining a plurality of coded tracks and a common track, a set of contacts for each disc engageable with the coded tracks and common track respectively, a translator unit having a number of input lines equal to and connected respectively to the contacts for the coded tracks and a plurality of output lines, switch means in the translator unit connected to the output lines respectively and operable selectively to supply voltages to the output lines, individual controls for the switch means each including an electronic valve, circuits normally biasing the electronic valves to cut off, means responsive to different combinations of voltage in the input lines selectively to remove the bias from the electronic valves to make them conductive, and means operable successively to apply voltage from the coded tracks on the discs to the input lines thereby successively to read out the valves corresponding to the disc positions.

6. The electromechanical accumulator of claim 5 including a gating circuit normally biasing all of the electronic valves to cut off, and gating means operable simultaneously with the voltage applying means to remove the biasing voltage from the gating circuit.

7. An electromechanical accumulator comprising a plurality of rotatably mounted discs, means to turn the discs to a position corresponding to a value to be indicated, each of the discs having thereon a conductive coded pattern defining a plurality of coded tracks and a common track, a set of contacts for each disc engageable with the coded tracks and common track respectively, a translator unit having a number of input lines equal to and connected respectively to the contacts for the coded tracks and a plurality of output lines, switch means in the translator unit connected to the output lines respectively and operable selectively to supply voltages to the output lines, individual controls for the switch means each including an electronic valve, a plurality of control lines and a gating line, the gating line being connected to each of the valves and the control lines being connected in predetermined combinations to the different valves, means normally to supply bias voltage to the control lines and gating line, the connections from the valves to the control and gating lines including rectifiers to prevent cross feeding of the bias voltage, means operable to apply voltage from the coded tracks on the discs successively to the input lines, means responsive to voltage on the input lines respectively to remove the bias voltage from the control lines, and gate control means operable simultaneously with the last named means to remove the bias voltage from the gating line.

References Cited

UNITED STATES PATENTS

| | | | |
|---|---|---|---|
| 2,793,807 | 5/1957 | Yaeger | 235—61 |
| 2,809,369 | 10/1957 | Feeney et al. | 340—347 |
| 2,958,861 | 11/1960 | Luongo et al. | 340—347 |
| 2,962,705 | 11/1960 | Relis et al. | 340—347 |
| 2,966,670 | 12/1960 | Foss | 340—347 |
| 3,171,117 | 2/1965 | Wilson et al. | 340—347 |
| 3,274,584 | 9/1966 | Morgan et al. | 340—347 |
| 3,286,251 | 11/1966 | Byun et al. | 340—347 |
| 3,314,063 | 4/1967 | Brothman et al. | 340—347 |

MAYNARD R. WILBUR, *Primary Examiner.*

W. J. KOPACZ, *Assistant Examiner.*